US006636710B2

(12) United States Patent
Oyaide

(10) Patent No.: US 6,636,710 B2
(45) Date of Patent: Oct. 21, 2003

(54) MULTI FUNCTION PERIPHERAL HAVING IMPROVED POWER SAVING FUNCTION AND CONTROL METHOD THEREOF

(75) Inventor: Masaaki Oyaide, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/981,204

(22) Filed: Oct. 17, 2001

(65) Prior Publication Data

US 2003/0072582 A1 Apr. 17, 2003

(51) Int. Cl.[7] .................... G03G 15/20; G03G 15/00; H04N 1/04

(52) U.S. Cl. .................... 399/70; 358/474; 399/2

(58) Field of Search .................... 399/70, 1, 2, 38; 358/474, 296

(56) References Cited

U.S. PATENT DOCUMENTS

| | | | | | |
|---|---|---|---|---|---|
| 5,321,478 | A | * | 6/1994 | Nakamura et al. | 399/70 |
| 5,550,637 | A | * | 8/1996 | Murakami | 358/296 |
| 5,761,575 | A | * | 6/1998 | Kimoto | 399/70 |
| 5,832,332 | A | * | 11/1998 | Sugiura | |
| 5,897,242 | A | * | 4/1999 | Hosoi | 399/70 |
| 5,936,743 | A | * | 8/1999 | Satoh | |
| 5,974,284 | A | * | 10/1999 | Sato et al. | 399/2 |
| 6,091,515 | A | * | 7/2000 | Kimura | |
| 6,134,401 | A | * | 10/2000 | Yun et al. | 399/70 |
| 6,393,233 | B1 | * | 5/2002 | Soulier | |
| 2002/0010854 | A1 | * | 1/2002 | Ogura et al. | |

FOREIGN PATENT DOCUMENTS

| | | | | |
|---|---|---|---|---|
| JP | 02235478 | A | * | 9/1990 |
| JP | 6-324531 | A | | 11/1994 |
| JP | 7-154518 | | * | 6/1995 |
| JP | 7-154559 | | * | 6/1995 |
| JP | 10-63136 | | * | 3/1998 |
| JP | 10224535 | A | * | 8/1998 |
| JP | 10-308833 | | * | 11/1998 |
| JP | 11-243464 | | * | 9/1999 |
| JP | 2000125057 | A | * | 4/2000 |
| JP | 2001-53942 | | * | 2/2001 |
| JP | 2001-111732 | | * | 4/2001 |
| JP | 2001-201986 | | * | 7/2001 |

* cited by examiner

*Primary Examiner*—Susan S. Y. Lee
(74) *Attorney, Agent, or Firm*—Frishauf, Holtz, Goodman & Chick, P.C.

(57) ABSTRACT

A power saving mode, in which the temperature of a heater of a printer is made lower than a predetermined temperature, is turned on when a predetermined condition has been met, and turned off when a job has occurred. The power saving mode is continued if a job has occurred in a state in which the power saving mode is turned on and the job that has occurred is a job which does not use the printer.

6 Claims, 2 Drawing Sheets

MULTI FUNCTION PERIPHERAL HAVING IMPROVED POWER SAVING FUNCTION AND CONTROL METHOD THEREOF

BACKGROUND OF THE INVENTION

1. Field of the Invention

The present invention relates to a multi-function peripheral (MFP) which includes a printer such as an electrophotographic type printer with a heater and can execute a plurality of jobs including a print job using the printer.

2. Description of the Related Art

In an MFP including a printer such as an electrophotographic type printer with a heater, it is necessary to maintain the operational temperature of the heater at a predetermined level in order to perform printing. Thus, much power is consumed in a state in which printing is performed.

Under the circumstances, a power save mode is provided in many cases. In the power save mode, the heater is turned off, or the temperature of the heater is maintained at a standby temperature lower than the operational temperature. Thus, power consumption is reduced.

When some job needs to be executed, the power save mode is turned off. Once the power save mode is turned off, the temperature of the heater is raised. If the temperature of the heater reaches its operational temperature, the MFP has come in the ready state and is capable of executing the job.

Even where a job which does not require the printer is executed, the job cannot be executed until the elevation of temperature is completed, and a useless standby time will pass. Moreover, even where a job which does not require the printer is executed, the power save mode is turned off and, as a result, useless power will be consumed.

BRIEF SUMMARY OF THE INVENTION

The object of the present invention is to quickly execute a job from a state in which a power save mode is turned on, and to make effective use of the power save function, thereby further saving power.

According to an aspect of the invention, there is provided a multi-function peripheral which can execute a plurality of kinds of jobs including printing of an image, comprising: a printer having a heater and performing the printing in a state in which the temperature of the heater is a predetermined temperature; a power saving process section which turns on a power saving mode in which the temperature of the heater is made lower than the predetermined temperature, when a predetermined condition has been met, and turns off the power saving mode when a job has occurred; and a continuous process section which causes the power saving process section to continue the power saving mode, when a job has occurred in a state in which the power saving mode is turned on by the power saving process section if the job that has occurred is a job which does not use the printer.

According to another aspect of the invention, there is provided a control method for controlling a multi-function peripheral which can execute a plurality of kinds of jobs including printing of an image by a printer having a heater and performing the printing in a state in which the temperature of the heater is a predetermined temperature, wherein a power saving mode, in which the temperature of the heater is made lower than the predetermined temperature, is turned on when a predetermined condition has been met, and turned off when a job has occurred, and the power saving process section is caused to continue the power saving mode, when a job has occurred in a state in which the power saving mode is turned on if the job that has occurred is a job which does not use the printer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
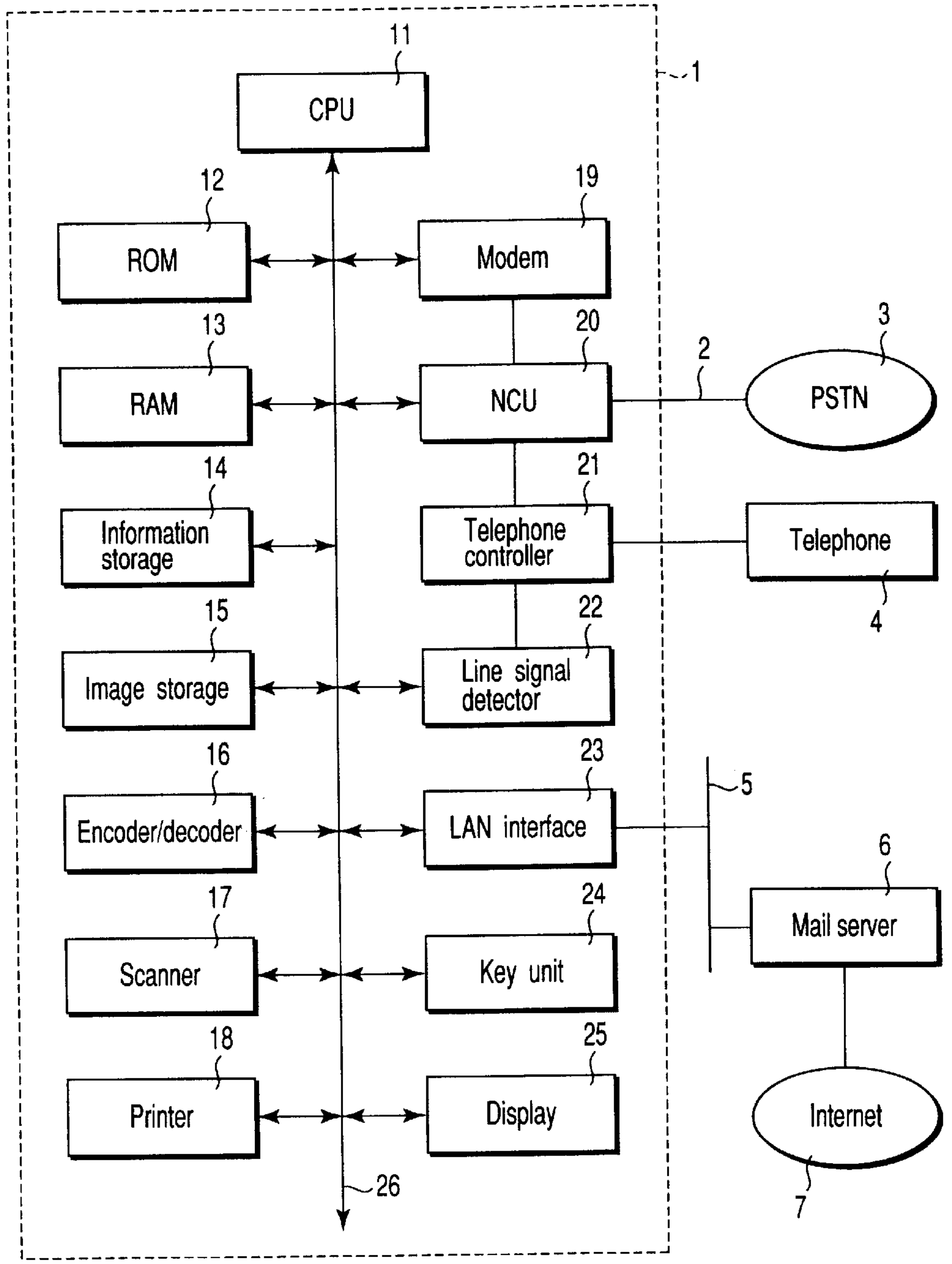
FIG. 1 is a block diagram showing an MFP according to an embodiment of the invention.

FIG. 1 is a block diagram showing an MFP according to an embodiment of the invention.

In FIG. 1, the MFP according to this embodiment is denoted by reference numeral 1. The MFP 1, as shown in FIG. 1, comprises a CPU 11, a ROM 12, a RAM 13, an information storage 14, an image storage 15, an encoder/decoder 16, a scanner 17, a printer 18, a modem 19, an NCU 20, a telephone controller 21, a line signal detector 22, a LAN interface 23, a key unit 24, and a display 25.

The CPU 11, ROM 12, RAM 13, information storage 14, image storage 15, encoder/decoder 16, scanner 17, printer 18, modem 19, NCU 20, line signal detector 22, LAN interface 23, key unit 24 and display 25 are interconnected over a bus 26. The modem 19 and telephone controller 21 are connected to the NCU 20. The line signal detector 22 is connected to the telephone controller 21.

The CPU 11 executes software processes based on operation programs stored in the ROM 12, thereby controlling the respective parts to realize the operations of the MFP.

The ROM 12 stores the operation programs, etc.

The RAM 13 is used as, e.g. a work area for storing various information necessary for the CPU 11 to execute various processes.

The information storage 14 is realized by using, e.g. a flash memory. The information storage 14 stores various setting information and other information.

The image storage 15 is realized by using, e.g. a large-capacity DRAM, or a hard disc drive. The image storage 15 temporarily stores received image data and image data to be transmitted.

The encoder/decoder 16 subjects image data to an encoding process for redundancy compression. The encoder/decoder 16 decodes image data which has been encoded for redundancy compression.

The scanner 17 reads an original for transmission, and generates image data corresponding to the original.

The printer 18 prints an image represented by image data on print paper. The printer 18 is of electrophotography type, and it has a heater for fixation.

The modem 19 generates a facsimile transmission signal by modulating image data, and generates a command transmission signal by modulating a command sent from the CPU 11. The modem 19 sends these transmission signals to a PSTN subscriber line 2 via the NCU 20. The modem 19 receives via the NCU 20 a facsimile transmission signal and a command transmission signal, which come via the PSTN subscriber line 2. The modem 19 reproduces image data by demodulating the facsimile transmission signal, and reproduces a command by demodulating the command transmission signal.

A PSTN 3 is connected to the NCU 20 via the PSTN subscriber line 2. The NCU 20 monitors the state of the PSTN subscriber line 2 and performs a signal calling process for transmission to the PSTN 3. In addition, the NCU 20 equalizes facsimile transmission signals sent from the modem 19 to the PSTN subscriber line 2 and sets the output level of facsimile transmission signals.

A telephone 4 is connected to the telephone controller 21, where necessary. The telephone controller 21 executes a well-known control to enable a call to be made via the PSTN subscriber line 2 with use of the connected telephone 4.

Various signals coming from the PSTN subscriber line 2 are delivered to the line signal detector 22 via the NCU 20 and telephone controller 21. The line signal detector 22 monitors the delivered signals and detects the arrival of a predetermined signal.

The LAN interface 23 is connected to a LAN line 5. A mail server 6 is connected to the LAN line 5. The mail server 6 is connected to the Internet 7. The LAN interface 23 performs data transmission via the LAN line 5 and Internet 7.

The key unit 24 has a number of key switches and accepts various instructions to the CPU 11 by the user. The key switches of the key unit 24 include a FAX key and a scanner key. The FAX key accepts a start instruction for starting a job for facsimile transmission. The scanner key accepts a start instruction for starting a job for a scanner operation.

The display 25 comprises, e.g. an LCD, and it displays various information to be indicated to the user under control of the CPU 11.

The CPU 11 executes software processes based on the operation programs stored in the ROM 12 and functions as a general well-known control section in the MFP. In addition, the CPU 11 functions as a power save process section, a transmission process section, a result printing process section, a receiving process section, a memory reception process section, and a continuous process section.

The power save process section performs a process for turn on and turn off power saving. The transmission process section processes a job for facsimile transmission. The result printing process section causes the printer 18 to print out a communication report indicating a result of facsimile transmission. The receiving process section performs a job for facsimile reception. The memory reception process section processes a job for memory reception, by which data received by the receiving process section is stored in the image storage 15. The continuous process section performs a process for continuing power saving, if a job requiring no use of the printer 18 occurs in a power save mode.

The operation of the MFP with the above structure will now be described. This MFP has a plurality of functions such as a copying function, a printer function, a facsimile function and a scanner function. The operations for realizing these functions are the same as those of the conventional MFP, so a description thereof is omitted. The operation relating to power saving, which characterizes the present invention, will mainly be described.

The CPU 11 initiates power saving, if a predetermined condition is met in a state in which power saving is not turned on. The predetermined condition is, for example, passing of a predetermined time in a state in which no job occurs. If the power saving is initiated, the heater of the printer 18 is turned off or the temperature of the heater is maintained at a standby temperature lower than an operation temperature.

Figure 2:
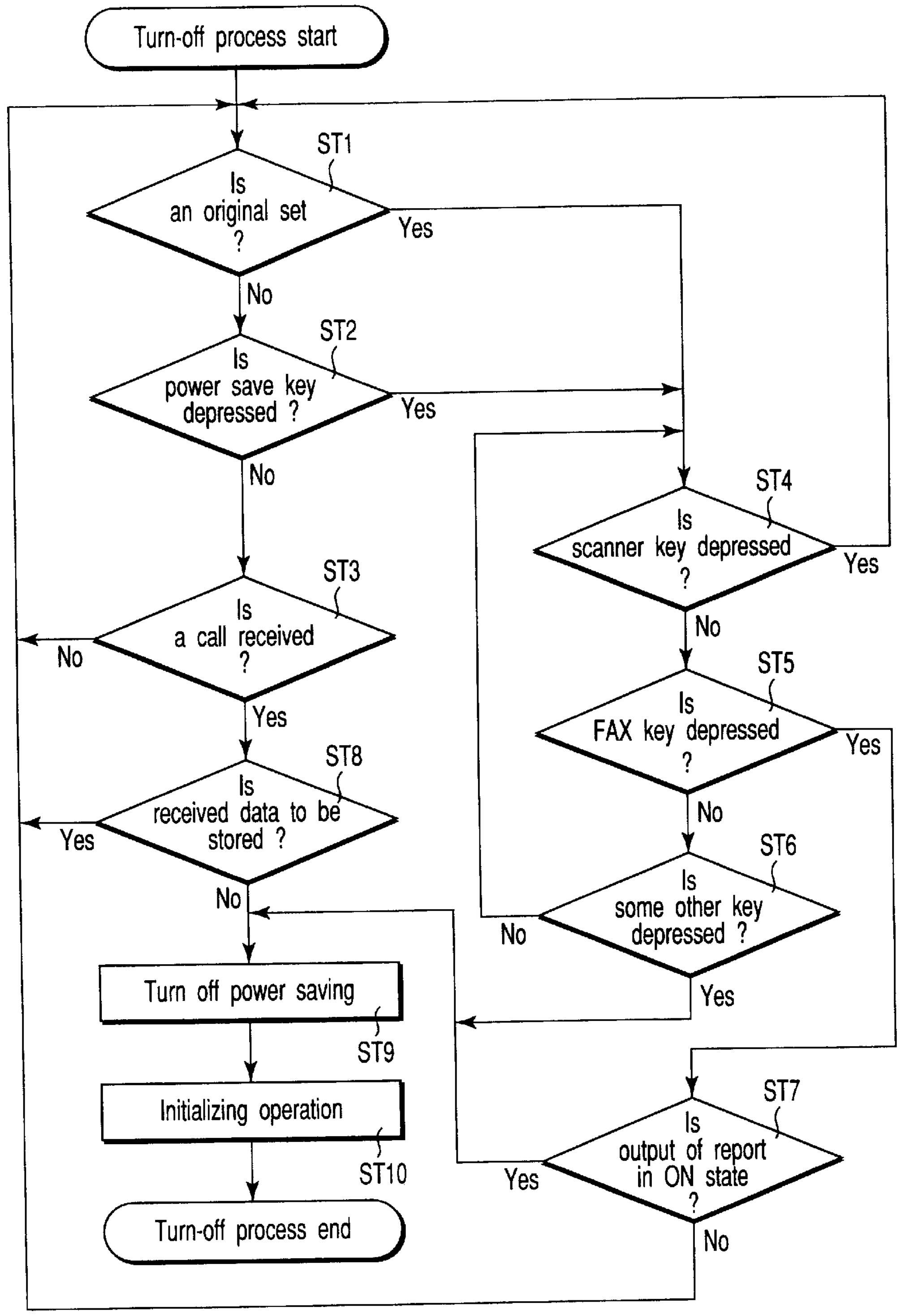
FIG. 2 is a flow chart illustrating a turn-off process by the CPU in FIG. 1.

In the state in which the power saving is turned on, the CPU 11 executes a turn-off process illustrated in FIG. 2.

In the turn-off process, the CPU 11 waits for the setting of an original on the scanner 17, or the depression of a power save key of the key unit 24, or the occurrence of an incoming call (steps ST1 to ST3).

In this state, if the setting of the original is confirmed in step ST1 or the depression of the power save key is confirmed in step ST2, the CPU 11 advances to a process for waiting for the depression of the scanner key, FAX key or some other key of the key unit 24. (steps ST4 to ST6).

When the scanner function of the MFP is to be used, a method of user operations is determined such that the scanner key provided on the key unit 24 is depressed. Specifically, if the scanner key is depressed, a job for realizing the scanner function will occur. This job does not require use of the printer 18. Thus, if the depression of the scanner key is confirmed in step ST4, the CPU 11 does not turn off the power saving in accordance with the occurrence of this job and returns to the waiting state in steps ST1 to ST3.

On the other hand, when the facsimile transmission function of the MFP is to be used, a method of user operations is determined such that the FAX key provided on the key unit 24 is depressed. Specifically, if the FAX key is depressed, a job for realizing the facsimile transmission function will occur. In this job, whether the use of printer 18 is required or not varies depending on whether the output of a communication report is necessary or not. If the depression of the FAX key is confirmed in step ST5, the CPU 11 determines whether the output of a communication report is set in the ON state (step ST7). If the output of the communication report is set in the OFF state, the current job does not require the printer 18. If it is determined in step ST7 that the output of the communication report is in the OFF state, the CPU 11 does not turn off the power saving in accordance with the occurrence of this job and returns to the waiting state in steps ST1 to ST3.

If a call occurs from the PSTN 3, a job for realizing the facsimile receiving function occurs. In this job, whether the use of printer 18 is required or not varies depending on whether received data is to be stored in the image storage 15 or not. When the occurrence of a call from the PSTN 3 is confirmed in step ST3, the CPU 11 determines whether the received data is to be stored or not (step ST8). If the received data is to be stored, the current job does not require the printer 18. Thus, if it is determined in step ST8 that the received data is to be stored, the CPU 11 does not turn off the power saving in accordance with the occurrence of this job and returns to the waiting state in steps ST1 to ST3.

If a key on the key unit 24, other than the scanner key and FAX key, is depressed when the CPU 11 is in the waiting state in steps ST4 to ST6, this means that the execution of a function other than the scanner function and facsimile transmission function has been requested by the user. In this MFP, such a function is a copy function or a printer function, which requires the use of printer 18.

If the output of the communication report is set in the ON state when the job for executing facsimile transmission has occurred, this job is a job requiring the use of printer 18 to print out the communication report.

If received data is not to be stored when the job for executing facsimile reception has occurred, this job is a job requiring the use of printer 18 to print out the received data.

The CPU 11 turns off the power saving of the printer 18 (step ST9), if it has been determined in step ST6 that a key other than the scanner key and FAX key has been depressed, if it has been determined in step ST7 that the output of the communication report is set in the ON state, or if it has been determined in step ST8 that the received data is not to be stored. If the power saving is turned off, the temperature of the heater of the printer 18 is elevated and maintained at the operation temperature. Subsequently, the CPU 11 initializes the respective sections relating to printing (step ST10). Thus, the turn-off process is completed.

As described above, even if a job occurs in the state in which the power saving of the printer 18 is turned on, if the job does not require the printer 18, the power saving is not turned off and is continued.

The CPU 11 executes a job, which has occurred, by another task process, irrespective of whether the power saving is turned off or not in the turn-off process. If the power saving is not turned off, the job is immediately started. However, if the power saving is turned off, the job is started after the temperature of the heater has been elevated.

According to the present embodiment, it is possible to prevent the power saving from being turned off when the job that does not require the printer 18 is executed. As a result, useless power consumption can be prevented. Moreover, since a job requiring no use of printer 18 can be started without waiting for heating-up of the heater, the job can be efficiently executed without causing useless wait time.

In the above embodiment, the job for realizing the scanner function, the job for facsimile transmission without output of a communication report and the job for facsimile reception without storage of received data are exemplified as jobs that do not require the printer 18. However, it is not necessary that all of these jobs are provided. In addition, other jobs may be included in the jobs that do not require the printer 18.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-function peripheral which can execute a plurality of kinds of jobs including printing of an image, said multi-function peripheral comprising:

a printer which includes a heater and which performs a printing operation in a state in which a temperature of the heater is a predetermined temperature;

a power saving process section which turns on a power saving mode in which the temperature of the heater is made lower than the predetermined temperature, when a predetermined condition has been met, and which turns off the power saving mode when a job which requires use of the printer is performed; and a continuous process section which causes the power saving process section to continue the power saving mode, when a job which does not require use of the printer is performed a continuous process section which causes the power saving process section to continue the power saving mode, when the power saving mode is already turned on and a job which does not require use of the printer is performed.

2. A multi-function peripheral according to claim 1, further comprising a transmission process section which performs facsimile transmission, wherein said continuous process section causes the power saving process section to continue the power saving mode if the job that is performed is a facsimile transmission operation by the transmission process section.

3. A multi-function peripheral according to claim 1, further comprising a transmission process section which performs facsimile transmission, and a result print process section which causes the printer to print out an image indicating a result of facsimile transmission by the transmission process section, wherein said continuous process section causes the power saving process section to turn off the power saving mode if the result print process section is made effective and the job that is performed is a facsimile transmission operation by the transmission process section.

4. A multi-function peripheral according to claim 1, further comprising:

a receiving process section which performs facsimile reception of image data;

a memory for storing image data; and a memory reception process section which stores, in the memory, the image data received by the receiving process section, wherein said continuous process section causes the power saving process section to continue the power saving mode if the job that is performed is a facsimile reception operation in which the image data received by the receiving process section is stored in the memory by the memory reception process section.

5. A multi-function peripheral according to claim 1, further comprising:

a scanner which reads an image formed on an original and generates corresponding image data; and an output section which outputs the image data generated by the scanner, wherein said continuous process section causes the power saving process section to continue the power saving mode if the job that is performed is a scanning operation by the scanner to generate the image data to be output by the output section.

6. A control method for controlling a multi-function peripheral which can execute a plurality of kinds of jobs including printing of an image by a printer that includes a heater and that performs a printing operation in a state in which a temperature of the heater is a predetermined temperature, said control method comprising:

turning on a power saving mode, in which the temperature of the heater is made lower than the predetermined temperature, when a predetermined condition has been met;

turning off the power saving mode when a job which requires use of the printer is performed; and causing the power saving mode to be continued when the power saving mode is already turned on and a job which does not require use of the printer is performed.

* * * * *